United States Patent
Jeanvoine et al.

(10) Patent No.: US 7,624,595 B2
(45) Date of Patent: Dec. 1, 2009

(54) METHOD AND DEVICE FOR MELTING AND REFINING MATERIALS CAPABLE OF BEING VITRIFIED

(75) Inventors: Pierre Jeanvoine, rue de Chambourcy (FR); Tanguy Massart, Poyanne (FR); Anne Berthereau, Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 706 days.

(21) Appl. No.: 10/841,549

(22) Filed: May 10, 2004

(65) Prior Publication Data

US 2004/0206124 A1 Oct. 21, 2004

Related U.S. Application Data

(62) Division of application No. 10/195,070, filed on Jul. 15, 2002, now Pat. No. 6,739,152, which is a division of application No. 09/367,879, filed as application No. PCT/FR99/00027 on Jan. 8, 1999, now Pat. No. 6,460,376.

(30) Foreign Application Priority Data

| Jan. 9, 1998 | (FR) | .................................. 98 00176 |
| Mar. 9, 1998 | (FR) | .................................. 98 02849 |

(51) Int. Cl.
*C03B 37/014* (2006.01)

(52) U.S. Cl. .............................. 65/157; 65/346; 65/347; 65/134.2; 65/134.3; 65/134.7; 65/134.9

(58) Field of Classification Search ................ 65/134.2, 65/134.3, 134.7, 134.9, 157, 346, 347; 55/400
See application file for complete search history.

(56) References Cited

U.S. PATENT DOCUMENTS

| 3,606,825 | A | | 9/1971 | Johnson | |
| 3,754,886 | A | * | 8/1973 | Richards et al. | ............ 65/134.7 |
| 3,819,350 | A | * | 6/1974 | Pellett et al. | ............... 65/134.9 |
| 3,938,981 | A | | 2/1976 | St. John | |
| 3,951,635 | A | * | 4/1976 | Rough, Sr. | .................. 65/134.9 |

(Continued)

FOREIGN PATENT DOCUMENTS

EP 0 231 518 A2 8/1987

(Continued)

OTHER PUBLICATIONS

Japanese Patent Document 59-111943 (English Abstract).*

(Continued)

*Primary Examiner*—Eric Hug
*Assistant Examiner*—Russell J Kemmerle, III
(74) *Attorney, Agent, or Firm*—Oblon, Spivak, McClelland, Maier & Neustadt, L.L.P.

(57) ABSTRACT

A process for melting and refining vitrifiable materials, such that all or part of the thermal energy necessary for melting the said vitrifiable materials is supplied by the combustion of fossil fuel(s) with at least one oxidizer gas, the fuel(s)/gas or the gaseous products resulting from the combustion being injected below the level of the mass of vitrifiable materials (7). The refining of the vitrifiable materials after melting comprises at least one step of subjecting them to subatmospheric pressure while centrifuging.

8 Claims, 5 Drawing Sheets

U.S. PATENT DOCUMENTS

| | | | | |
|---|---|---|---|---|
| 3,992,183 | A * | 11/1976 | Rough | 65/178 |
| 4,040,795 | A * | 8/1977 | Jung | 23/293 R |
| 4,081,261 | A | 3/1978 | Tilton | |
| 4,353,726 | A | 10/1982 | Rough, Sr. | |
| 4,539,034 | A | 9/1985 | Hanneken | |
| 4,704,153 | A * | 11/1987 | Schwenninger et al. | 65/134.2 |
| 4,738,938 | A * | 4/1988 | Kunkle et al. | 501/72 |
| 4,780,121 | A * | 10/1988 | Matesa | 62/134 |
| 4,780,122 | A * | 10/1988 | Schwenninger et al. | 65/134.2 |
| 4,812,372 | A | 3/1989 | Kithany | |
| 4,919,700 | A | 4/1990 | Pecoraro et al. | |
| 5,246,478 | A * | 9/1993 | Yabuki | 65/334 |
| 5,316,563 | A * | 5/1994 | Ishimura et al. | 65/32.5 |
| 5,551,312 | A * | 9/1996 | Masson | 73/863.81 |
| 5,849,058 | A * | 12/1998 | Takeshita et al. | 65/134.2 |
| RE36,082 | E * | 2/1999 | Ishimura et al. | 65/32.5 |
| 6,119,484 | A * | 9/2000 | Takei et al. | 65/134.2 |
| 6,202,445 | B1 * | 3/2001 | Sugimoto et al. | 65/134.2 |
| 6,294,005 | B1 * | 9/2001 | Inoue et al. | 96/193 |
| 6,308,534 | B1 * | 10/2001 | Takei et al. | 65/347 |
| 6,318,126 | B1 * | 11/2001 | Takei et al. | 65/134.2 |
| 6,334,336 | B1 * | 1/2002 | Takei et al. | 65/134.2 |
| 6,401,492 | B1 | 6/2002 | Nattermann | |
| 6,405,564 | B1 * | 6/2002 | Takei et al. | 65/157 |
| 2001/0037661 | A1 * | 11/2001 | Takei et al. | 65/134.2 |
| 2002/0162358 | A1 | 11/2002 | Jeanvoine et al. | |

FOREIGN PATENT DOCUMENTS

| | | |
|---|---|---|
| GB | 1 416 027 | 12/1975 |
| JP | 59-111943 | 6/1984 |
| JP | 61048438 | 3/1986 |
| JP | 06-305735 | 11/1994 |
| SU | 1567527 | 5/1990 |

OTHER PUBLICATIONS

An Experimental Furnace with Gas Combustion in the Melt and Thin-Layer Fining, Babich and Pankova, Avtosteklo Plant Institute of Gas, Academy of Sciences of the Ukrainian SSR; State Scientific Research Institute of Glass, Sep. 1974. pp. 623-625.*

An Experimental Furnace with Gas Combustion in the Melt and Thin-Layer Fining, Babich and Pankova, Avtosteklo Plant Institute of Gas, Academy of Sciences of the Ukrainian SSR; State Scientific Research Institute of Glass, Sep. 1974, pp. 623-625.

Zaitsev, et al.. "Cooling by evaporation of oven walls for glass melting" Kharkov, published by "Osnova" from Kharkow University, 1993, pp. 13, 14 (Russian Text).

* cited by examiner

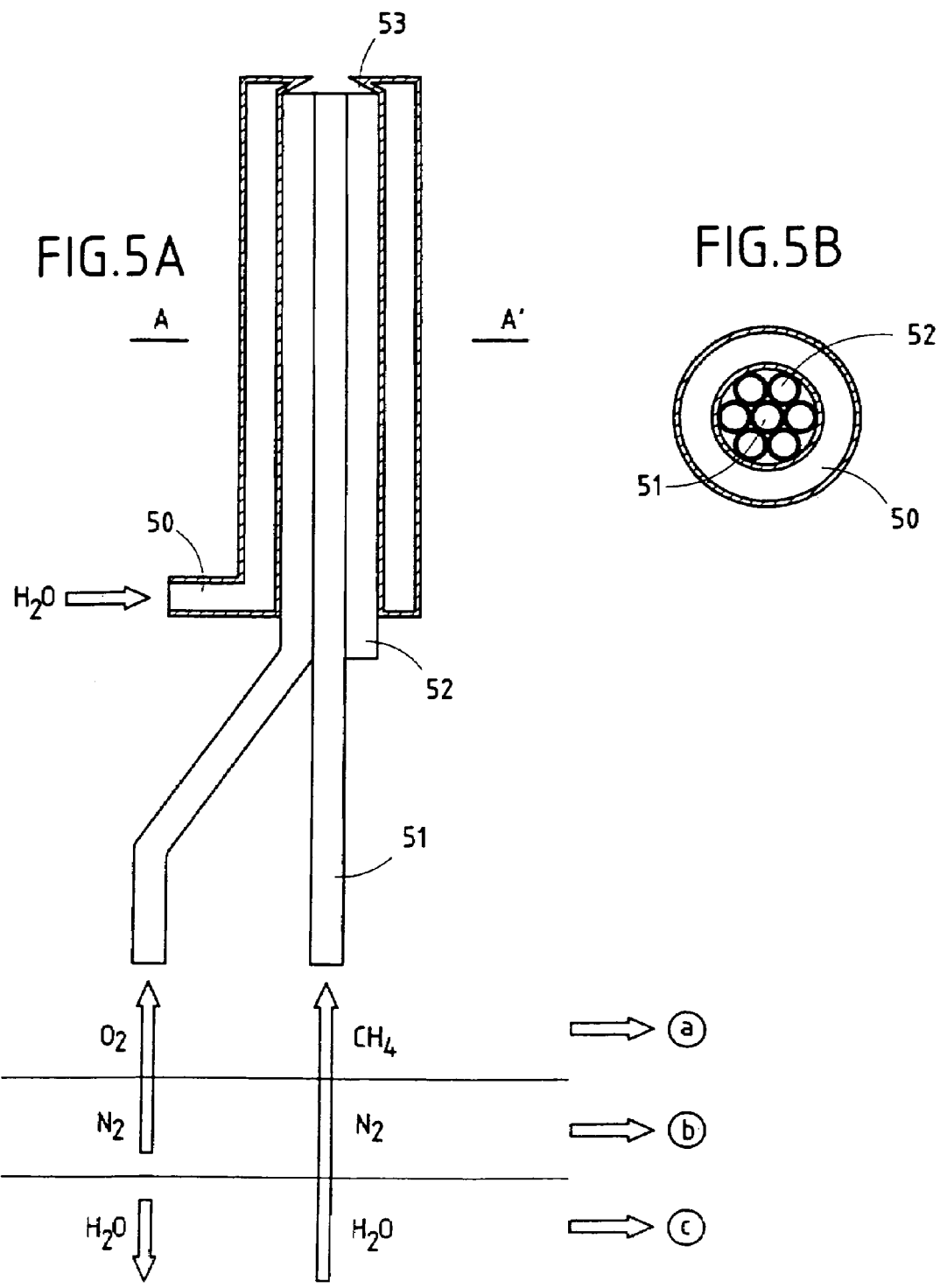

METHOD AND DEVICE FOR MELTING AND REFINING MATERIALS CAPABLE OF BEING VITRIFIED

This application is a Division of U.S. application Ser. No. 10/195,070 filed on Jul. 15, 2002, now U.S. Pat. No. 6,739,152, which is a Division of U.S. application Ser. No. 09/367,879 filed on Jan. 18, 2000, now U.S. Pat. No. 6,460,376, which is a National Stage of International PCT application No. PCT/FR99/00027, filed Jan. 8, 1999.

BACKGROUND OF THE INVENTION

1. Field of the Invention

The invention relates to a process for melting and refining vitrifiable materials for the purpose of continuously feeding glass-forming plants with molten glass.

2. Description of the Related Art

More particularly intended are plants for forming flat glass such as float or rolling plants, but also plants for forming glassware of the bottle or flask type, plants for forming glass fibres of the mineral wool type for thermal or acoustic insulation or else textile glass fibres called reinforcing fibres.

A great deal of research has been carried out on these processes, which schematically comprise a first melting step followed by a refining step intended to condition the molten glass thermally and chemically and in eliminating therefrom any batch stone, bubbles or any cause of defects appearing after forming.

In the melting range, it has thus been sought, for example, to speed up the melting process or to improve its energy efficiency. Mention may thus be made of the process consisting in rapidly heating the vitrifiable materials in a homogeneous and controlled manner while carrying out intense mechanical stirring allowing the still-solid vitrifiable materials to be brought into intimate contact with the already-liquid phase. This process is especially detailed in Patents FR-2,423,452, FR-2,281,902, FR-2,340,911 and FR-2,551,746 and generally uses electrical heating means of the submerged-electrode type.

Another type of melting process has been developed, for example of the type of those described in U.S. Pat. No. 3,627,504, U.S. Pat. No. 3,260,587 or U.S. Pat. No. 4,539,034 which consist in using, as heating means, submerged burners, that is to say burners fed with gas and air, these generally being placed so as to be flush with the bottom wall so that the flame develops within the mass of vitrifiable materials during liquefaction.

In either case, although it is possible actually to very significantly reduce the residence time of the vitrifiable materials in the melting chamber and to considerably increase the production efficiency compared with "conventional" melting operations, the molten glass being molten is, on the other hand, in the form of a foam which is difficult to refine—it is especially difficult to guarantee the quality of the final glass, especially optical glass.

Research has also been conducted in the refining field. Thus, it is, for example, known from Patent EP-775,671 and U.S. Pat. No. 4,919,097 to carry out at least part of the refining operation under reduced pressure, thereby making it possible, for example, to obtain glass very low in sulphates and with a high redox. However, such refining causes intense foaming, which may be difficult to control and remove.

SUMMARY OF THE INVENTION

The object of the invention is therefore to improve melting and refining processes, aiming especially to use plants which are more compact and/or have greater operating flexibility and/or greater production efficiency, etc., without these industrial advantages being obtained to the detriment of the quality of the glass produced.

The subject of the invention is firstly a process for melting and refining vitrifiable materials, which is characterized by the combination of two characteristics:

on the one hand, all or part of the thermal energy necessary for melting the vitrifiable materials is supplied by the combustion of fossil fuel(s) with at least one oxidizer gas, the fuels/gas or the gaseous products resulting from the combustion being injected below the level of the mass of vitrifiable materials, on the other hand, the refining of the vitrifiable materials after melting comprises at least one step of subjecting them to subatmospheric pressure.

There has in fact proved to be an extremely advantageous synergy from an industrial standpoint between the use of melting called hereafter "melting by submerged burners" for the sake of simplicity and that of refining at reduced pressure.

However, although the principle of reduced-pressure refining was known in its generality, it remained difficult to use and the user was not sure of obtaining the same acceptable residual level of bubbles/batch stones as with conventional refining. In the invention, very particular refining is used by changing a size parameter, namely instead of feeding the refining zone with "conventional" molten glass to be refined, it is fed here with a glass obtained by melting by submerged burners, that is to say with glass having very special characteristics in the sense that it is foamy throughout, with a relatively low density compared with that of a standard glass. Nothing would suggest that it would be possible to refine an initially relatively foamy glass at reduced pressure.

Surprisingly, this has proved to be possible as it has been discovered that this foamy glass resulting from melting by submerged burners also had the characteristic of containing only an extremely small amount of sulphates, which may or may not have been present initially. The sulphate content is generally less than 600 and even less than 200 or less than 100 ppm, or indeed less than 50 ppm, expressed by weight of $SO_3$ in the glass leaving the melting chamber, this being so without having to control or reduce the amount of sulphate normally contained in the batch materials used, unintentionally, or even by intentionally adding sulphates to the vitrifiable materials. It is this low amount of sulphate which allows effective refining under reduced pressure without any problem. In contrast, a high or simply "standard" sulphate content in the glass to be refined would have caused, during reduced-pressure refining, a very high expansion of the foam by desulphation, which expansion would have been very difficult to control. The fact that there is almost no sulphate in the glass leaving the melting chamber may especially be explained by the partial pressure of water generated by the combustion by burners submerged in the vitrifiable materials.

It should be noted that a desulphated glass gives fewer problems of volatile compounds in the float bath, fewer risks of the formation of tin sulphide and therefore, finally, fewer risks of a tin defect in the sheet of glass.

Another highly advantageous characteristic of the glass leaving the melting chamber according to the invention should also be noted: although it is actually in the form of a kind of foam which remains to be refined, it is possible to control the size of the bubbles which it contains and, especially in certain cases, to remove almost all the smallest bubbles, that is to say those having a diameter of less than 200 μm, by carrying out, on this glass while it is being melted, a kind of "microrefining" prior to the actual refining after the melting, this microrefining facilitating the coalescence of the bubbles and the disappearance of the smaller bubbles in favor of the larger ones and being promoted by the addition into the vitrifiable materials of refining promoters of the coke or sulphate type. Furthermore, this glass leaving the melting chamber generally has a particularly low residual amount of batch stone, thereby also, just like the size of the bubbles, facilitating the refining operation after the melting operation.

The invention therefore makes it possible to have glasses which are very low in sulphate even before the refining operation, therefore glasses which are at least as low, or even deplete, in sulphate after refining, this being so without having to purify/select vitrifiable materials so that they are low in sulphate. On the contrary, it is even possible to add sulphate at the start, something which is completely surprising and advantageous.

One advantageous effect obtained by the combination according to the invention relates to the energy cost of the process; melting by submerged burners makes it possible to avoid using electrical melting of the submerged-electrode type, the cost of which may be very significant depending on the country. Furthermore, and this is the most important point, melting by submerged burners creates convective stirring within the vitrifiable materials during liquefaction, as explained in detail below. This very strong mixing between materials not yet liquefied and those which are already molten is extremely effective and makes it possible to achieve, for vitrifiable materials of the same chemical composition, melting at a lower temperature and/or melting which is much more rapid than with conventional heating means. Refining under reduced pressure also makes it possible to refine the glass at a lower temperature and much more rapidly. This is because lowering the pressure during refining causes an increase in the molar volume of the gases contained in the molten vitrifiable materials, hence an increase in the volume of bubbles that they contain and consequently an increase in their rate of rise to the surface of the bath and to their rate of removal.

By refining at reduced pressure it is possible "to be allowed" to work at lower temperatures than in conventional refining operations, actually within the lower temperatures used in the technique of melting by submerged burners.

The temperatures encountered both in melting and reining according to the invention are therefore completely compatible with and matched to each other, and are everywhere lower than in the usual processes, something which is economically very advantageous, simply in terms of energy cost, but also by the selection of refractory-type materials used in the manufacture of the plants—materials which are less hot corrode more slowly.

The residence times in the melting and refining zones are also very significantly reduced and are compatible, this obviously having a very positive effect on the production efficiency and on the output of the plant in its entirety. At the same time, the invention makes it possible to obtain plants which are very compact—this is because melting by submerged burners, again due to the very strong mixing that it causes, allows the size of the melting chamber to be considerably reduced. Furthermore, refining under reduced pressure has the same consequences on the size of the compartment(s) where this operation is carried out—overall, the plant may therefore be very compact, with clear advantages in terms of construction cost, of operating simplification, of reduction in the wear of the structural materials, etc.

With regard to the melting operation, the oxidizer chosen may, according to the invention, be based on air, on oxygen-enriched air or even substantially based on oxygen. A high oxygen concentration in the oxidizer is in fact advantageous for various reasons: it thus reduces the volume of combustion smoke, this being favorable from the energy standpoint and avoiding any risk of excessive fluidization of the vitrifiable materials which could cause them to splash onto the superstructures or roofs of the melting chamber. Furthermore, "the flames" obtained are shorter and more emissive, allowing more rapid transfer of their energy to the vitrifiable materials and secondarily making it possible to reduce, if desired, the depth of the "bath" of vitrifiable materials being liquefied. We speak here of "flames", but these are not necessarily flames in the usual sense of the term. We may speak, more generally of "combustion regions". Furthermore, any emission of polluting $NO_x$ gas is thus reduced to the minimum.

With regard to the selection of the fuel, this may or may not be of the gaseous fossil fuel type, such as natural gas, propane, fuel oil or any other hydrocarbon fuel. It may also be hydrogen. The process of melting by submerged burners according to the invention is therefore an advantageous means of using hydrogen, which is, moreover, difficult to use with "overhead", non-submerged, burners, given the low-emissivity character of the flames obtained by $H_2/O_1$ combustion.

Combining the use, in melting by submerged burners, of an oxygen oxidizer and of a hydrogen fuel is a good means of ensuring effective heat transfer of the energy from the burners to the molten glass, leading moreover to a completely "clean" process, that is to say without the emission of nitrogen oxides, $NO_X$, or of greenhouse gases of the $CO_x$ type, other than that which may arise from the decarbonization of the batch materials.

Advantageously, the melting is carried out according to the invention in at least one melting chamber which is equipped with burners which are placed so that their combustion regions or combustion gases develop in the mass of vitrifiable materials during melting. They are thus made to pass through its side walls and/or the bottom wall, and/or to suspend them from the top, fastening them to the roof or to any suitable superstructure. These burners may be such that their gas supply pipes are flush with the wall through which they pass. It may be preferable for these pipes to "enter", at least partly, the mass of vitrifiable materials so as to prevent the flames from being too great near the walls and not to cause premature wear of the refractory materials. It is also possible to choose to inject only the combustion gases, the combustion regions being produced outside the melting chamber proper.

As mentioned above, it has turned out that this method of heating caused intense convective stirring of the vitrifiable materials—convection loops thus form on each side of the combustion regions or "flames" or streams of combustion gases, permanently mixing the molten and not yet molten materials very effectively. This thus results in the highly favorable characteristics of "stirred" melting, without having to make use of mechanical stirring means which are not very reliable and/or subject to rapid wear.

Preferably, the height of the mass of vitrifiable materials in the melting chamber and the height at which the combustion regions or gases resulting from the combustion develop are adjusted so that these combustion regions/gases remain within the mass of the vitrifiable materials—the aim is thus to allow the convective circulation loops to be established in the material during liquefaction.

In general, this type of melting makes it possible to considerably reduce the emission of any type of dust in the melting chamber and of any gas of the $NO_x$ type since heat exchange takes place very quickly, thereby avoiding the temperature peaks likely to be conducive to the formation of these gases. It also considerably reduces the emission of gases of the $CO_x$ type.

Optionally, the melting operation may be preceded by a step of preheating the vitrifiable materials to a temperature which is, however, markedly less than that necessary to liquefy them, for example to at most 900° C. In order to carry out this preheating operation, the thermal energy of the smoke may advantageously be recovered. By thus extracting the heat from the smoke, the specific energy consumption of the plant may be decreased overall.

The vitrifiable materials may comprise batch materials, but also cullet or even scrap intended to be vitrified. They may also comprise combustible elements (organic matter): it is thus possible to recycle, for example, mineral fibres which have been sized with binder (of the type used in thermal or acoustic insulation or of those used in the reinforcement of plastics), window panes laminated with sheets of polymer of the polyvinyl butyral type, such as windscreens, or any type of "composite" material which combines glass with plastics, such as certain bottles. It is thus possible to recycle "glass/metal or metal compound composites" such as window panes functionalized with coatings containing metals, these being difficult hitherto to recycle since this would run the risk of gradually enriching the melting chamber with metals which would build up on the surface of the bottom wall. However, the stirring caused by the melting according to the invention prevents this sedimentation and thus allows, for example, window panes coated with layers of enamel, with layers of metal and/or of various connection elements to be recycled.

The subject of the invention is also the recycling of all these composite elements containing glass because of the melting by submerged burners in a glass furnace. In particular, furnaces with submerged burners may be provided, the essential functional of which is the manufacture of a cullet from these various materials to be recycled, which particular cullet may then serve, possibly combined with standard cullet, as batch materials for conventional glass furnaces.

Advantageously, provision may be made to introduce all or part of the vitrifiable materials into the melting chamber below the level of the mass of vitrifiable materials being melted. Some of these materials may be conventionally introduced from above the mass being liquefied and the rest from below, for example by supply means of the feed-screw type. The materials may thus be introduced directly into the mass being liquefied, at a single point or at various points distributed over the walls of the melting chamber. Such an introduction directly into the mass of materials being liquefied (hereafter referred to as the "melt") is advantageous for more than one reason: firstly, it considerably reduces any risk of batch materials flying off above the melt, and therefore reduces the amount of solid dust emitted by the furnace to the minimum. Thus, it allows better control of the minimum residence time of the materials before they are extracted into the refining zone and allows them to be selectively introduced at the point where the convective stirring is the strongest, depending on the arrangement of the submerged burners. This or these points of introduction into the melt may thus be near the surface or more deeply in the melt, for example at a melt height of between $1/5^{th}$ and $4/5$ths of the total height of the melt above the level of the bottom wall, or else between $1/3$ and $2/3$ of the height.

It has been seen that the process according to the invention makes it possible to recycle plastics in the form of composite products combined most particularly with glass, these plastics thus serving as part of the fuel. It is also possible, and advantageous, to introduce all or part of the fuel necessary for the melting by submerged burners in the form of a solid fuel (polymer-type organic materials or coal) or even a liquid fuel, this fuel being a partial substitute for at least the liquid (especially fossil) or gaseous fuels feeding the burners. In general, the term "vitrifiable materials" or "batch materials" used in the present text is intended to encompass the materials necessary for obtaining a glassy (or ceramic or glass-ceramic) matrix, but also all the additives (refining additives, etc.), all the optional liquid or solid fuels (plastic of composite or non-composite material, organic matter, coal, etc), and any type of cullet.

The process according to the invention may operate with a high level of cullet.

As mentioned above, the refining according to the invention is therefore carried out on molten vitrifiable materials of the glass type in the foamy state. Typically, this foam has a relative density of approximately 1 to 2 for example (to be compared with a relative density of about 2.4 in the case of non-foamy glass), preferably a sulphate content of at most 100 or even of at most 50 ppm expressed as weight of $SO_3$ and most of the bubbles having a diameter of at least 200 μm. It may thus have a density of between 0.5 and 2 $g/cm^2$, especially 1 to 2 $g/cm^3$.

In order to improve the performance characteristics of the refining operation, various refining promoters are preferably added to the vitrifiable materials, the aim being especially to remove from the glass any bubbles having a diameter of less than 200 μm right from the melting stage, as mentioned above. These may be reducing additives, such as coke (which also allows the redox of the glass to be adjusted). In this case, it is advantageous to select coke powder which has an average particle size of less than 200 μm. They may also be sulphates. Refining under reduced pressure causes the bubbles to grow, the aim being for this growth to occur rapidly and that it is possible to remove and burst the bubbles on the surface of the melt easily. Other refining promoters will be more effective during the stage of the refining proper, after the melting stage. They allow the foam to be "destabilized"; they may, for example, be fluorine of a fluorine or chlorine compound, more generally halides, or else a nitrate of the $NaNO_3$ type; fluorine seems to lower the viscosity of the glass and thus helps to drain the films which form between the bubbles, which draining promotes collapse of the foam. It also lowers the surface tension of the glass.

Another factor influencing the way the bubbles grow during the refining under reduced pressure is the nature of the gases above the molten material. It is possible, of course, simply to choose a partial pressure of air. It is also possible to choose to enrich the atmosphere with an inert gas of the nitrogen type, or even to choose only a partial pressure of an inert gas of the nitrogen type. This is because it has been noticed that choosing a residual pressure of an inert gas of the nitrogen type was favorable to bursting of the bubbles on the surface during the refining operation. In fact, too high a concentration of oxidizing gas of the $O_2$ type seems unfavorably to tend to reduce this bursting.

Advantageously, the subatmospheric pressure at which at least part of the refining is carried out is less than or equal to 0.5 atmospheres ($0.5 \times 10^5$ Pa), especially about 0.3 to 0.01 atmospheres (approximately $3 \times 10^4$ to $1 \times 10^3$ Pa).

Advantageously, the process according to the invention makes it possible to carry out the melting and/or refining at temperatures not exceeding 1400° C., especially at 1380° C. or 1350° C.

According to a first variant, the refining according to the invention may be carried out in at least one static compartment (one which does not move during operation) downstream of the melting chamber, at least one zone in the static chamber being at a reduced pressure.

According to a second variant, the refining is always carried out downstream of the melting chamber but in a compartment capable of being rotated so as to ensure centrifugal refining, with at least one zone of the compartment, especially the furthest upstream, at a reduced pressure.

A third variant consists in a combination of the above two, especially by using, for the refining operation, a first compartment which is static with a zone under reduced pressure and then a second compartment which rotates and also comprises a zone under reduced pressure, the pressure preferably being lower than in the static compartment.

According to one way of carrying out the process according to the invention, provision is made to treat the flux of molten vitrifiable materials, between the melting phase, by at least one flow-dividing means. This means, for example an element drilled with holes via which the flow of molten glass is forced to pass, makes it possible to divide this flow into a large number of small-diameter streams. The size of the holes is advantageously chosen so as to be close to the size of the bubbles which it is desired to remove. Thus, if the flow-dividing means is placed just downstream of the atmospheric-pressure zone of the refining compartment, the reduced pressure will act very rapidly on the streams generated by the flow-dividing means and allow rapid refining, even with very large glass throughputs. The feeding of the refining compartment with glass to be refined may thus become similar to that obtained by a die emerging in a reduced-pressure chamber.

(In the context of the invention, the terms "upstream" and "downstream" refer to the direction of flow of the glass through the plant from the point where the vitrifiable materials are fed into the melting chamber to the point where the refined glass is extracted).

The melting/refining process according to the invention allows glasses of highly varied compositions and properties to be manufactured. Moreover, it makes it possible, because of its low inertia, to switch from one composition to another with very short transition times.

It thus allows relatively reduced glasses, especially those having a redox of greater than or equal to 0.3, to be manufactured. (The redox is defined as the ratio of the ferrous iron FeO content, as a percentage by weight, to the total iron content by weight of the composition expressed in the form of $Fe_2O_3$).

It also allows glasses having a high $SiO_2$ content, for example at least 72 or even at least 750 by weight, to be manufactured, these glasses generally being difficult to melt but advantageous, especially in terms of batch material cost, because they have a low density and are very compatible with plastics. It also makes it possible to manufacture quite special glasses, having a high alkaline-earth oxide content, for example containing at least 18% by weight of CaO, which glasses are, however, quite corrosive using the conventional melting processes at a higher temperature than in the invention, as well as glasses having a low sodium oxide content of at most 11% by weight for example, or having a very low sulphate content, for example of at most 100 ppm. Glasses containing iron, with a high redox but a low sulphate content also allow glasses to be obtained which have a residual blue color which is particularly attractive and sought after in the field of flat glass for motor vehicles and for buildings, for example. Highly selective solar-protection glasses may thus be obtained on which may be deposited solar-protection layers in order to enhance the thermal performance characteristics thereof, for example layers of the TiN type, these being described especially in Patents EP-638,527 and EP-511,901.

The subject of the invention is also a melting and refining apparatus which is especially suitable for implementing the process described above and which comprises:

at least one melting chamber equipped with burners which are fed with fossil fuel(s) of the (natural) gas type and with oxidizer(s) of the air or oxygen type, the burners being placed so as to inject these gases or the gases resulting from the combustion below the level of the mass of vitrifiable materials introduced into the melting chamber, at least one refining compartment downstream of the melting chamber and comprising at least one zone which can be subjected to subatmospheric pressure.

Advantageously, as mentioned previously, the melting chamber may be equipped with at least one means of introducing vitrifiable materials below the level of the melt, especially at least two of them, preferably in the form of an opening (or openings in the associated wall(s), with a supply means of the feed-screw type. The risks of dust flying off are thus minimized, while at the same time also optionally allowing the introduction, above the melt, of the vitrifiable materials, such as silica, on which a preheating operation may be carried out without the risk of them setting solid.

Independently of the refining operation too, the invention also depends on design improvements with regard to the walls of the melting chamber which are intended to be in contact with the melt. Several variants are possible. In certain cases, known oxide-based refractory materials may be used, such as alumina, zirconia, chromium oxide and so-called AZS refractories. It is generally preferred to combine them with a cooling system involving the circulation of a fluid of the water type (water jacket). The water jacket may be placed on the outside, the refractories then being in direct contact with the glass, or on the inside. The water jacket then has the function of creating a cooler stream of glass near the refractories, these being particularly stressed in this context as the melt generated by the submerged burners causes strong convective currents against the walls.

Another variant consists in using, in the melt zone, not refractories but only the abovementioned water jacket.

Another variant consists in using refractory materials (optionally combined with a cooling system of the water-jacket type) and in lining them with a lining made of a highly refractory metal such as molybdenum (or an Mo alloy). This lining may advantageously be held at some distance (for example from 1 to a few millimeters) from the walls of the refractories and may present the melt with a continuous contact surface (solid plate or plates made of Mo) or a discontinuous contact surface (Mo plate or plates drilled with holes). This lining has the purpose of mechanically preventing direct convection of the glass onto the refractories by generating a "still" layer of glass along the refractories, or even by preventing any contact of the glass with the latter.

In the melting chamber, all or some of the submerged burners are preferably designed so that they can inject, into the melt, a fluid which does not participate in the combustion by substituting (temporarily) for the oxidizer and/or the fuel. This fluid may be an inert gas of the $N_2$ type or a coolant of the liquid-water type which immediately vaporizes in the melt. The fact of thus temporarily stopping the combustion, while continuing to inject a fluid at the burner, generally has two objectives: either it is desired to stop the operation of the burner and more generally, for example, of the melting chamber in its entirety, the injection of inert gas of the $N_2$ type allowing the chamber to be made safe in the region of the burners, or it is desired to change the burner for another while the other burners are operating and while it is therefore still in the presence of a glass melt. In this case, as explained in detail below, spraying water suitably via the burner allows the glass above the burner to be temporarily frozen, creating a kind of "bell", which allows a time long enough to carry out the change without glazing the burner.

As mentioned above, the apparatus according to the invention may be provided with a flow-dividing means between the melting chamber and the refining compartment, especially just at the inlet of the refining compartment or in its furthest upstream part. This may be an element drilled with holes of suitable size.

Moreover, it should be noted that using such a flow-dividing means may also be envisaged independently of the melting means adopted: such a dividing means allows more rapid refining, with large glass throughputs, whatever the manner in which the glass is melted, for example by conventional means of the overhead (non-submerged) burner type and/or by electric melting using submerged electrodes.

Likewise, it may be advantageous to use it even if the refining operation is carried out at atmospheric pressure.

However, it is particularly advantageous to employ it in a context of melting by submerged burners which tends to generate a foam having a very high bubble content and/or in a context of refining under reduced pressure, as it considerably increases its effectiveness, which is already particularly high.

According to a first variant mentioned above, the refining compartment is static and in a vertical orientation (i.e., its height is significantly greater than its floor dimensions). This compartment comprises, according to a first embodiment, an approximately vertical internal partition which defines, in combination with the internal walls of the compartment, at least two channels. These consist, in succession, of a first channel which forces the molten vitrifiable materials to follow an ascending path and then a second channel which forces the vitrifiable materials to follow a descending path, the first channel being preferably the one which is subjected to subatmospheric pressure. A kind of siphon for the glass to be refined is thus created. This compartment is advantageously equipped with means for adjusting/regulating the head loss of the molten vitrifiable materials at the inlet of the refining compartment. Likewise, the height of the refining compartment may be adjusted depending on various criteria, especially depending on the level of underpressure chosen in the reduced-pressure zone.

According to a second embodiment, the static refining compartment used in the context of the invention is in a vertical orientation and comprises means for introducing the molten vitrifiable materials to be refined in the upper part and means for removing the refined materials in the lower part, the materials everywhere following a mainly vertical descending path in the compartment. Its design may, for example, be derived from the teachings from Patents EP-231,518, EP-253,188, EP-257,238 and EP-297,405.

According to a second variant, the refining compartment comprises at least one device capable of being rotated in order to ensure centrifugal refining, the internal walls of the device substantially defining the shape of a hollow vertical cylinder, at least in its central part. Advantageously, the device comprises a so-called upper zone at subatmospheric pressure and a so-called lower zone left at ambient pressure, these being separated from each other by one or more mechanical means of the type consisting of a metal plate drilled with one or more holes.

According to a preferred design, the device is fed at the upper part with molten vitrifiable materials by a static supply means of the flow-channel type. These supply means may comprise at least one compartment at reduced pressure in order to allow the device to be fed and/or to allow a first refining operation to be carried out.

Sealing means have to be provided in order to join the end of this supply means to the device, the sealing means being of the "dynamic seal" type or rotating seal, as explained in detail below. The device is advantageously provided with means for trapping solid particles having a density greater than that of the glass, these means especially being located in its lower zone and being in the form of notches/grooves made in its internal walls. Preferably, the speed of rotation of the device is selected to be between 100 and 1500 revolutions per minute.

The apparatus may also be provided with mechanical means which are stationary or which follow its rotation, and are capable of shearing the foam and of driving it downwards into the lower zone of the device from which the refined glass is drawn off.

These means are especially in the form of pierced deflectors, or fins placed in the upper zone of the device.

This type of centrifugal refining, with passage into a reduced-pressure zone, is particularly effective. This is because the reduced pressure will allow the greatest possible increase in the bubbles before the centrifugal refining proper: the bubbles are removed more rapidly in the device the larger their diameter. The reduced pressure will also make it possible to further decrease the residual sulphate content of the glass produced. It should be noted that a desulphated glass (this remark also applies to the first variant in which the refining is carried out statically) gives fewer problems of volatile compounds in the float bath, a reduced risk of the formation of tin sulphide and therefore finally a reduced risk of a tin defect in the sheet of glass. This also guarantees the absence of sulphides in the case of reduces glasses, especially iron sulphides which give not very desirable yellow/orange residual colors or inclusions of nickel sulphide which may cause the glass to break during heat treatment of the quenching type.

The centrifugal refining comprising a reduced-pressure phase is particularly indicated in the case of the refining of relatively foamy glass.

BRIEF DESCRIPTION OF THE DRAWINGS

The invention will be explained in detail below with the aid of two non-limiting-embodiments illustrated by the following figures:

FIG. 5: a diagrammatic cross-sectional view of a submerged burner fitted into the melting chamber of the plants shown in FIGS. 1 and 2.

Figure 1:
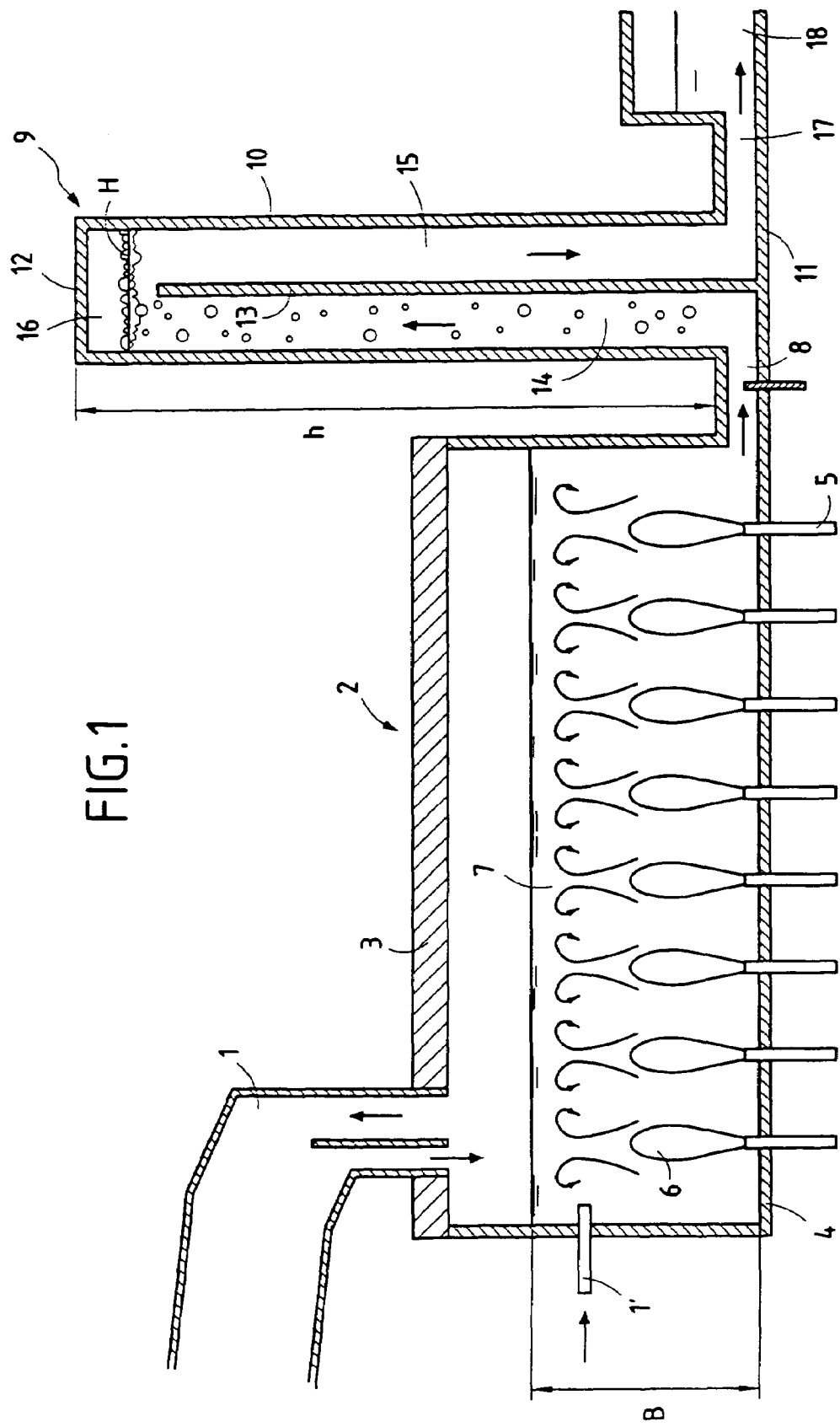
FIG. 1: a diagrammatic melting/refining plant using a static refining apparatus.

These figures are not necessarily to scale and for the sake of clarity have been extremely simplified.

DETAILED DESCRIPTION OF THE PREFERRED EMBODIMENTS

The apparatuses described below are designed to melt and refine glasses of highly varied composition, here glasses intended to feed a float plant for producing flat glass. But this application is not limiting.

Furthermore, of course, all the standard glasses of the silica-soda-lime type and various types of special glasses are particularly advantageous to manufacture using the apparatuses according to the invention, especially those deemed hitherto to be difficult to melt:

glasses having a low $Na_2O$ content and a relatively high alkaline-earth oxide, especially CaO, content, this being advantageous from an economic standpoint in terms of the cost of batch materials, but also glasses which are quite corrosive at conventional melting temperatures and which are relatively hard to melt using standard processes. These may be the glass compositions described, for example, in Patent: FR 97/08261 of 1 Jul. 1997, such as (in % by weight):

| | |
|---|---|
| $SiO_2$ | 72-74.3% |
| $Al_2O_3$ | 0-1.6% |
| $Na_2O$ | 11.1-13.3% |
| $K_2O$ | 0-1.5% |
| CaO | 7.5-10% |
| MgO | 3.5-4.5% |
| $Fe_2O_3$ | 0.1-1% | or else of compositions of the type (expressed in percentages by weight):

| | |
|---|---|
| $SiO_2$ | 66-72, especially 68-70% |
| $Al_2O_3$ | 0-2% |
| $Fe_2O_3$ | 0-1% |
| CaO | 15-22% |
| MgO | 0-6, especially 3-6% |
| $Na_2O$ | 4-9, especially 5-6% |
| $K_2O$ | 0-2, especially 0-1% |
| $SO_3$ | traces. |

Another example illustrating this family of compositions is as follows:

| | |
|---|---|
| $SiO_2$ | 69% |
| $Al_2O_3$ | 1% |
| $Fe_2O_3$ | 0.1% |
| CaO | 18.9% |
| MgO | 5% |
| $Na_2O$ | 5.6% |
| $K_2O$ | 0.3% |
| $SO_3$ | traces. |

This glass has a lower annealing temperature, also called the strain-point temperature, of 590° C. (at which temperature the glass has a viscosity of $10^{14.5}$ poise). It also has a liquidus temperature of 1225° C., a temperature $T_{\eta log 2}$ of 1431° C. and a temperature $T_{\eta log 3.5}$ of 1140° C. ($T_{\eta log(2)}$ and $T_{\eta log 3.5}$ correspond to the temperatures that the glass has when it reaches a viscosity, in poise, of log 2 and log 3.5, respectively);

glasses having a high silica content, these also being advantageous from the economic standpoint, and having a relatively low density, the compositional ranges of which, again expressed in percentages by weight, are as follows:

| | |
|---|---|
| $SiO_2$ | 72 to 80% |
| CaO + MgO + BaO | 0.3 to 14% |
| $Na_2O$ | 11 to 17% |
| alkaline oxides | 11 to 18.5% |
| $Al_2O_3$ | 0.2 to 2% |
| $B_2O_3$ | 0 to 2% |
| $Fe_2O_3$ | 0 to 3% |

| | |
|---|---|
| $SO_3$ | optionally traces |
| coke | 0-600 ppm | and optionally coloring oxides, for example the oxide of Ni, Cr, Co, etc. (These glasses have the feature of being particularly viscous).

An example illustrating this family of compositions is as follows:

| | |
|---|---|
| $SiO_2$ | 76.4% |
| $Fe_2O_3$ | 0.1% |
| $Al_2O_3$ | 0.1% |
| CaO | 7.6% |
| MgO | 5% |
| $Na_2O$ | 10% |
| $K_2O$ | 0.3%. |

It has a relative density of approximately 2.46 (compared with relative densities of 2.52 for the standard silica-soda-lime glass of the "Planilux" type sold by Saint-Gobain Vitrage).

It was also seen above that the process according to the invention could be used to obtain reduced glasses, the high redox, the iron content and the very low sulphate content which allow glasses with a residual blue color to be obtained.

Using the process according to the invention, it is also possible to manufacture glasses having a zero or almost zero content of alkali metal oxides of the $Na_2O$ type, especially for the purpose of applications for fire-resistance glazing or for substrates used for the electronics industry. For such compositions, reference may be made especially to Patents EP-526,272 and EP-576,362.

Other glasses, especially those having a low MgO content, of the type described in Patents EP-688,741 and WO 96/00194 may also be manufactured using the process of the invention.

A first method of implementation is therefore shown in FIG. 1: a channel 1 simultaneously allows some of the vitrifiable materials to be introduced into the melting chamber 2 via the roof 3 and the combustion smoke to be removed. This smoke will preheat these vitrifiable materials, thus recovering their thermal energy. The batch materials capable of thus being introduced above the melt 7 especially comprise silica, which can be preheated without setting into a solid mass. The rest of the batch materials are injected at least one point 1' located below the level of the melt 7, especially via an opening fed via a feed screw. Only one injection point has been shown here, this being furthermore placed rather high up with respect to the total height B of the melt, at about ⅔ of this height and on the front wall of the chamber.

In fact, several injection points may be provided in the walls (front walls or side wails) which may or may not be at this same height, especially in the upper half or in the lower half of this height B, for example between ⅓ and ⅔ of this height. In fact, this injection directly into the melt makes it possible to greatly reduce the amount of material flying off above the melt (emission of solid dust particles). Furthermore, depending on its configuration, it makes it possible to direct the materials at the point where the convective stirring is strongest and/or to take account of this in order for these materials to remain for at least the minimum period of time in the chamber 2 before passing into the refining zone.

The bottom wall 4 of the chamber is equipped with rows of burners 5 which pass through it and penetrate into the melting chamber over a small height. The burners 5 are preferably provided with cooling means, not shown, of the water-jacket type. The burners 5 in operation develop combustion regions in zones 6, creating, near them, convective streams within the vitrifiable material being liquefied. This convective stirring creates a foam which will transfer the thermal energy throughout the melt 7. The melting preferably takes place at about 1350° C., for example in the case of a standard glass of the family of silica-soda-lime glasses.

The walls of the chamber 2 which are in contact with the melt 7 here are made of refractory materials cooled, on the outside, by a cooling system of the water-jacket type (not shown). A variant consists in that this cooling system, with metal walls, lies against the refractories but on the inside and is therefore in contact with the melt. These two variants make it possible to slow down the wear of the refractories by superficially cooling the class near the walls of the refractories.

The operation of the burners 5 has been adapted to submerged melting in the manner shown very diagrammatically in FIG. 5. FIG. 5a shows a longitudinal section of a burner 5 and FIG. 5b shows a cross section, in the plane AA' indicated in FIG. 5a of the latter. The burner is jacketed with a cooling system 50 of the water-jacket type and has a central pipe 51 around which are concentrically placed a plurality of pipes 52, all these pipes of cylindrical section emerging in the nose of the burner 53.

In normal operation (operation [a]), the pipe 51 is fed with a combustible gas of the natural-gas type (or another combustible gas or fuel oil) and the pipes 52 are fed with oxidizer, in this case oxygen for example, the $CH_4/O_2$ interaction creating a combustion region in the melt.

In safety operation (operation [b]), that is to say when it is desired to stop the combustion at the burner without the risk of it being completely glazed, nitrogen is injected via the pipe 51 and/or via the pipes 52.

In operation intended to allow the burner to be exchanged for another (operation [c]), water is injected via the pipe 51, which water instantly vaporizes in the burner or right after leaving the burner, the vapor creating a kind of roof of cooled glass above the burner; any operation of the burner is then stopped and there is then enough time to carry out the exchange before the "roof" collapses. The injected water is at least partially collected in the burner by the pipes 52 (the roles of the pipes 51 and 52 in this operating mode may also be reversed). Any other coolant being thus able to freeze the glass may also be substituted.

The burner and its various operating modes described above form one subject of the invention, independently of the overall melting and refining operation involved in the glass plant.

The molten foamy glass resulting from the melting by submerged burners is then drawn off at the bottom part by a channel 8 provided with means for adjusting the head loss of the plunger type (not shown). The head loss of the foamy glass entering the static refining compartment 9 is thus controlled. This compartment has side walls 10, a bottom wall 11 at the same level as the bottom wall of the melting chamber, and an upper wall 12 defining an approximately parallelepidal internal volume. Also provided is a partition 13 fixed to the bottom wall 11, but leaving a passage at the top. This assembly also defines a channel 14 which forces the glass to follow an ascending path and then a channel 15 forcing the glass to follow a descending path. At the highest part 16, a glass level H is formed.

The refined glass is then drawn off via a channel 17 which feeds a compartment 18 supplying the glass to the float-type forming plant (not shown).

In the refining compartment, the region of the channel 14 is put under reduced pressure, for example 0.3 atmospheres. The foamy glass coming from the channel 8 will then rise in this channel, any residual batch stone being gradually "digested" and the bubbles growing in size as they rise up in the channel. However, the degree of expansion of the foam remains very moderate because the foam coming from the melting chamber 3 has a very low residual sulphate content. In zone 16, the bubbles burst at the surface H, the foam rapidly disappears and the fully refined glass goes back down along the channel 15. If necessary, provision may be made in this region 16 for there to be auxiliary heating means, of the conventional burner or electrical-resistance element type, these being attached to the wall 12, and optionally mechanical means (not shown) of the dam type, which are intended to facilitate the bursting of the bubbles.

In order to give an order of magnitude, the height h of the refining compartment may be of the order of a few meters, for example 3 meters, the case of the chosen reduced pressure of 0.3 atm.

Figure 2:
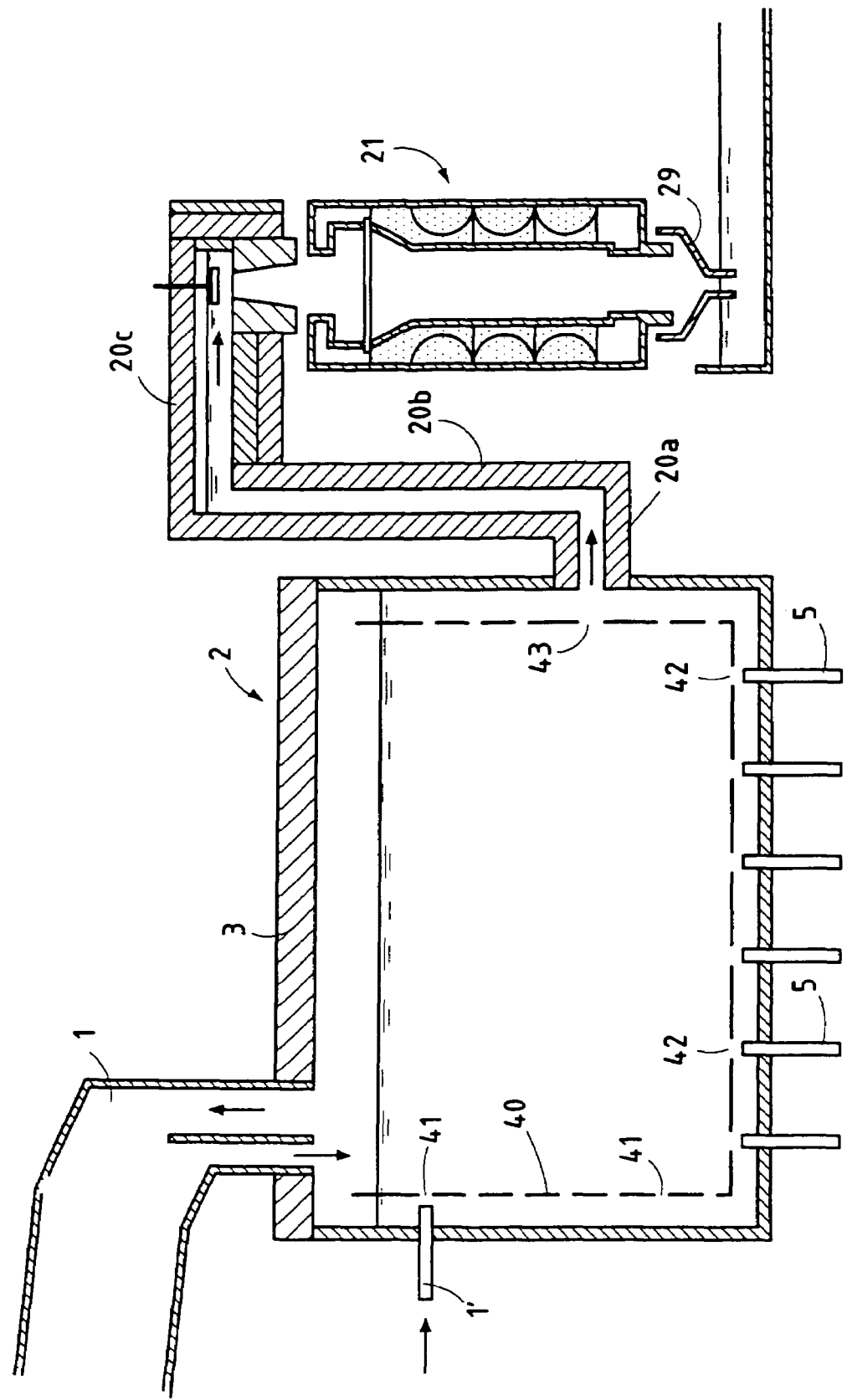
FIG. 2: a diagrammatic melting/refining plant using a centrifugal refining apparatus.
Figure 3:
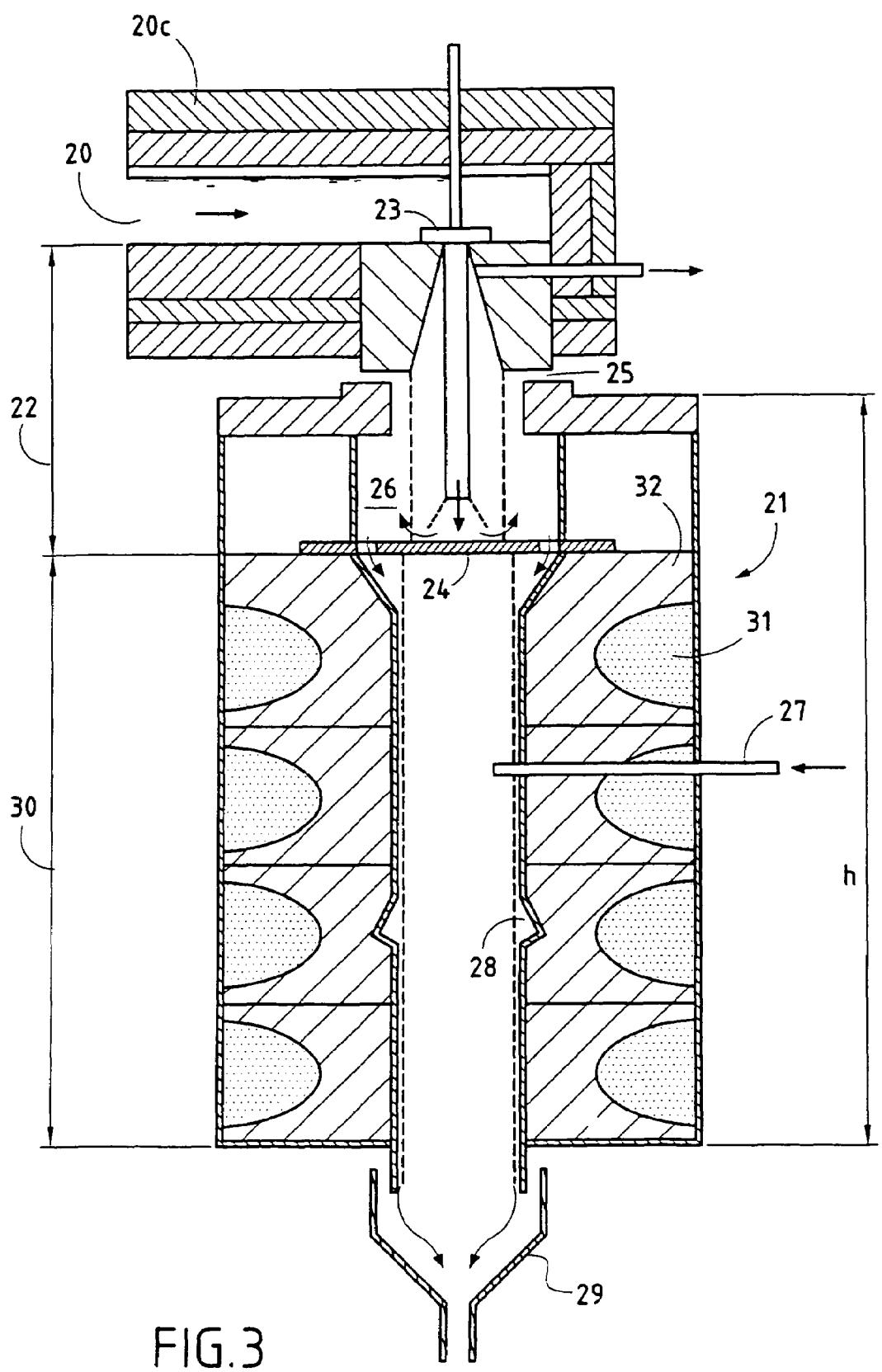
FIG. 3: an enlarged view of the refining apparatus of the plant according to FIG. 2.

FIGS. 2 and 3 show the second method or implementation. The melting chamber 2 generally has the same design as that shown in FIG. 1. The only difference resides in the way in which the walls of the refractories of the chamber 2 are protected. Here, immersed in the melt 7, is a lining of refractory metal consisting of a thin wall 40 of molybdenum matching the shape of the cavity of the melting chamber and held in place at a distance of from one to a few millimetres from the walls of the refractories by means of suitable spacers and/or by being suspended in the melt from the walls of the refractories located above the melt or from the roof.

This sheet 40 is drilled with holes, firstly in its horizontal zone lining the bottom wall 4, so as to be able to be penetrated by the burners 5, as well as in all its other walls, with a homogeneous partition in the holes: this piercing therefore does not prevent contact between the refractories and the molten glass, however it mechanically breaks the convection movements of the glass near the refractories and thus reduces their rate of wear. The holes 41 in the walls of the lining 40, apart from those lining the bottom wall, are preferably cylindrical and of varying dimensions, those in the wall on the bottom wall side comprise holes 42 whose size is sufficient to allow the burners 5 to pass through them. The lining 40 must also be widely pierced (at 43) in its wall lining at the downstream transverse wall of the chamber so that the glass can be removed via the channel 20a. The same applies to the zone 1' for introducing the batch materials: there is necessarily complementarity between the holes made in the walls made of refractories and in the lining made of molybdenum.

This Mo lining is in itself an invention, which is particularly appropriate in combination with a chamber for melting by submerged burners, independently of the way in which any subsequent refining may be carried out. (The same applies to the cooling, on the external side or the glass side, of the refractories, illustrated in the previous figure).

The other difference with FIG. 1 resides in the way in which the glass is drawn off from the melting chamber. In the case of FIG. 2, the glass is drawn off slightly "higher up", with a supply pipe 20 split into a horizontal first part 20(a), a vertical second part 20(b) and a horizontal third part 20(c) emerging in the apparatus of the centrifuger 21. In order for the glass to rise up in the channel and thus feed the centrifuger, it is necessary for at least the zone 20(b) of the channel to be at a moderate reduced pressure, for example at 0.5 atmospheres. Another variant consists in the molten glass being drawn off from the melting chamber at the top, for example by means of a submerged channel as is well known to those in the glass-making field.

FIG. 3 concentrates on the horizontal zone 20(c) of the channel 20 for supplying the molten foamy glass, drawn off from the melting chamber 2, which feeds the body of the centrifuger 21 with glass. The latter has an upper part 22 lying between the piece 23 and the metal plate 24, and a lower part 30 lying beneath the metal plate 24. The piece 23 is hollow, that is to say a cylinder provided with slots making it possible to regulate the flow rate, and the head loss of the glass entering the centrifuger 21. The glass also enters the upper part 22 where a partial vacuum, for example 0.1 bar or atmosphere, is established. The question arises as to the junction 25 between the static part of the channel 20 and the rotating part of the body 21.

A first solution consists in adopting a "dynamic" seal. The foamy glass leaving the hollow piece 23 will, due to the centrifugal force, tend to "rise" in the zone 26 and to leave spontaneously via the space left clear level with the junction 25—it is thus the glass itself which, being continuously ejected, provides the sealing function. The flow rate of the ejected glass may be limited or regulated by modulating the space between the moving assembly 21 and the fixed assembly 20.

Another solution consists in placing a so-called rotating seal of suitable composition in the junction 25. This may be a liquid-ring rotating seal, using a liquid having a very low vapor pressure, of the silicone-oil type, the operating principle of which is the same as that of liquid (ring vacuum pumps—the under pressure, in opposition to the partial vacuum existing inside the centrifuger.

The glass then flows via the holes in the plate 24 into the zone 23 provided with a venting line 27. This plate, at the very least for those parts completely submerged in the glass, may advantageously be made of molybdenum. The outer lining of the internal walls of the body of the centrifuger may consist of electrocast refractory pieces 32 comprising heat insulator 31 incorporated so that the later is not crushed by the centrifugal force. Also provided is a notch or groove 28 going around the internal (or discontinuous) wall of the part 30, which allows all the solid particles of density greater than that of the glass, of the refractory-inclusion type, to be trapped. This is because the upward flow of the glass in the centrifuger takes place in the following manner: the plate 24 divides the centrifuger into two parts and allows centrifusion of the glass as a thin layer reducing the height of the device with respect to that which would be necessary without it and without a reduced pressure being applied. One of the conditions for the glass to flow correctly upwards is that the pressure of the glass corresponding to the distance between the tops of the two parabolas be greater than the sum of the head losses and of the difference between the reduced pressure in the part 22 and the ambient pressure in the part 23, which is achievable. The glass flowing through the plate 24 will therefore be pressed against the internal walls of the part 30 in the form of a thin layer, the solid particles denser than the glass then being thrown against the walls and trapped in the grooves 28 from which they can no longer emerge. On the other hand, the bubbles grow and burst under the centripetal action towards the inside of the body of the centrifuger. Finally, in the lowest part of the part 30, the refined glass is drawn off via a channel the top of which has the approximate shape of a funnel 29. Under the standard operating condition, it is not necessary to provide glass-reheating means, the speed of rotation may be about 700 revolutions per minute and the height h of the centrifuger is, for example, 1 to 3 meters.

Figure 4:
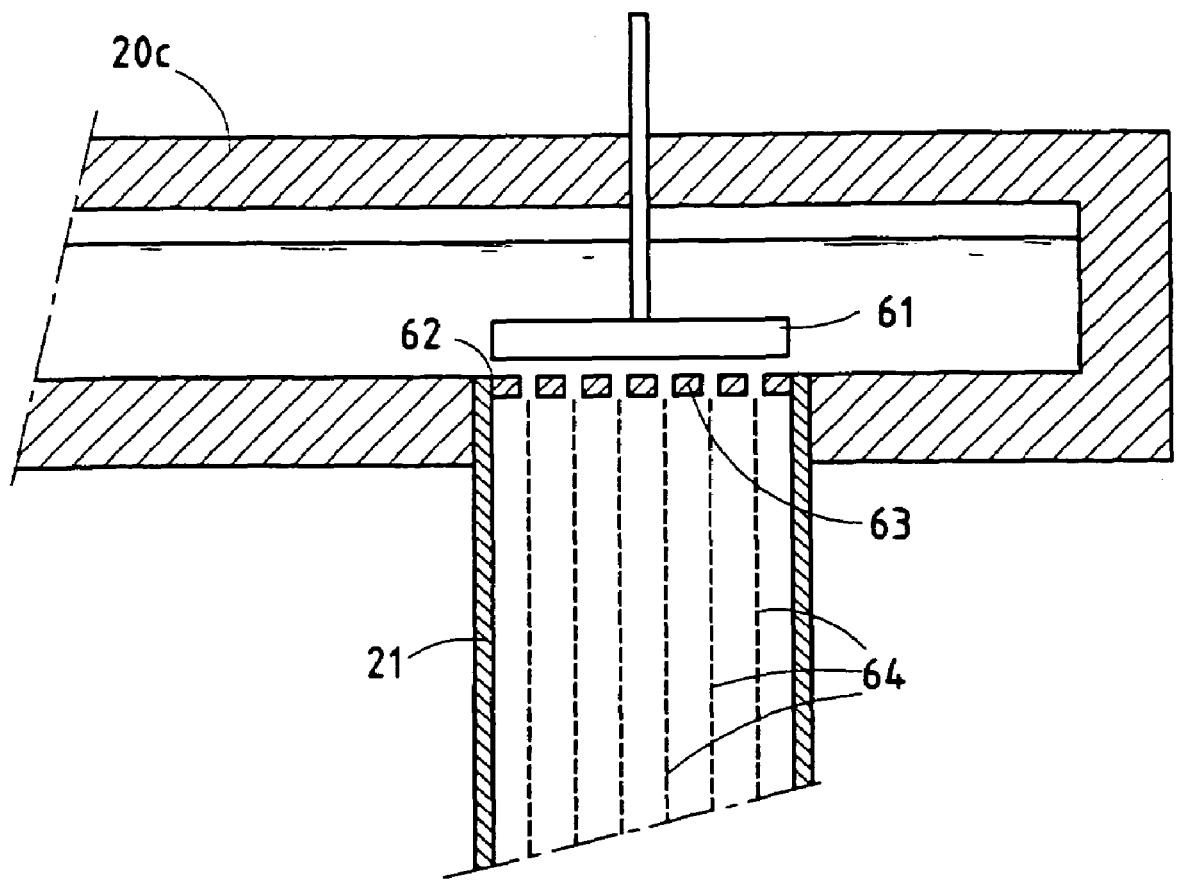
FIG. 4: a diagrammatic enlarged view of the flow divided used in the device shown in FIG. 2.

FIG. 4 shows in a very simplified manner a possible variant of the refiner according to FIGS. 2 and 3, this being concentrated on the junction zone 40 between the supply channel 20c at atmospheric pressure and the body of the centrifuger 21 at reduced pressure: shown there is a piston 61 capable of adjusting the head loss and the inlet pressure of the glass to be refined in the centrifuger 21. A molybdenum mesh 63 pierced uniformly with preferably cylindrical holes has been interposed in the outlet 62 in the channel 20c to the centrifuger, which mesh acts as a feed die for the centrifuger and divides the incoming flow of glass into a multiplicity of small streams of glass, these being shown highly diagrammatically by the reference 64 and having a diameter of approximately 1 to a few millimeters for example. This mesh 63 thus acts as a flow divider, the bubbles contained in each stream 64 being removed more rapidly than if they were contained in a steam of glass of much larger cross section. The combination of these small streams 64 with the use of a reduced pressure makes it possible for the bubbles in the glass to be burnst extremely rapidly. The streams 64 from which the bubbles have been removed are, at the bottom of the centrifuger 21, in the form of droplets which coalesce on its internal walls because of the centrifugal force.

The use of such a flow divider also has an advantage in the case in which the refining is carried out in a static refiner, as shown in FIG. 1.

In either case (static or centrifugal refiner), it is clear that the size of the melting/refining apparatuses currently available may be spectacularly reduced. It may furthermore be noted that it is advantageous for the partial vacuum, both in the case of the static refiner and the centrifugal refiner, to be a nitrogen vacuum, which facilitates the bursting of the bubbles and is less damaging for the metal pieces such as the piece 24 of the centrifugal refiner. It has also been advantageous to add to the vitrifiable materials refining promoters, the function of which has been described above, especially coke having a small particle size, sulphate, nitrate or fluorine.

Moreover, it should be noted that molybdenum optionally used in the melting chamber and/or in the refining compartment may consist of platinum.

It is important to emphasize that, although the combination of melting by submerged burners with a refining step using reduced pressurization is extremely advantageous, the invention also relates to these two aspects taken separately. Thus, it may be advantageous to use the method of melting by submerged burners with a standard refining step and, reciprocally, to use refining stet, with reduced pressurization following a melting step using conventional heating means, while still remaining within the scope of the invention, even if the synergy emphasized above is then no longer obtained.

It should also be noted that it may be advantageous to use the method of melting by submerged burners without any longer having to make any use of refining in the usual sense of the term. This may be the case in the field of fiberizing, in which it may be envisaged to feed the internal centrifugal fiberizing machines directly with foamy glass obtained using melting by submerged burners, the centrifuging necessarily carried out by this fiberizing technique achieving, de facto, the refining of the glass. It is also possible to envisage direct flotation of the foamy glass coming from the melting operation, for the purpose of manufacturing foam glass used as insulation, for example in the building industry.

It is also possible to apply this method of melting for recycling glass/metal or glass/plastic composite products, as mentioned above, either for producing usable glass or to produce cullet for feeding a conventional glass-making furnace (depending, in particular, on the proportion of these composite products with respect to the rest of the more conventional vitrifiable materials).

What is claimed:

1. Apparatus for refining a molten vitrifiable materials under a centrifugal force and under subatmospheric pressure comprising:
   a device adapted to be rotated such that a molten vitrifiable material therein is centrifugally refined; and
   at least one subatmospheric-pressure zone adapted to receive the molten vitrifiable material,
   wherein the said device includes an upper zone at subatmospheric pressure and a lower zone at an ambient pressure.

2. Apparatus according to claim 1, wherein internal walls of at least a central part of said device define approximately the shape of a hollow vertical cylinder.

3. Apparatus according to claim 1, wherein said lower and upper zones are separated from each other by one or more metal plates, each plate drilled with one or more holes.

4. Apparatus according to claim 1, wherein the said device is fed at the upper part with molten vitrifiable materials by a static supply means with sealing means between the said static supply means and the said device of the "dynamic" seal or rotating seal type.

5. Apparatus according to claim 1, wherein the device is provided with one or more means for trapping solid particles.

6. Apparatus according to claim 5, wherein, the means for trapping solid particles is located in a lower zone of the device and comprises notches or grooves made in internal walls of said device.

7. Apparatus according to claim 1, wherein the device is provided with means which follows its rotation and is capable of shearing the vitrifiable material.

8. Apparatus according to claim 1, wherein the vitrifiable material is produced continuously.

* * * * *